United States Patent
Battle et al.

(10) Patent No.: US 10,949,213 B2
(45) Date of Patent: Mar. 16, 2021

(54) LOGICAL REGISTER RECOVERY WITHIN A PROCESSOR

(71) Applicant: International Business Machines Corporation, Armonk, NY (US)

(72) Inventors: Steven J. Battle, Austin, TX (US); Salma Ayub, Austin, TX (US); Brian D. Barrick, Pflugerville, TX (US); Joshua W. Bowman, Austin, TX (US); Susan E. Eisen, Round Rock, TX (US); Brandon Goddard, Kirkland, WA (US); Christopher M. Mueller, Round Rock, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 16/210,349

(22) Filed: Dec. 5, 2018

(65) Prior Publication Data
US 2020/0183700 A1 Jun. 11, 2020

(51) Int. Cl.
*G06F 9/38* (2018.01)
*G06F 9/30* (2018.01)

(52) U.S. Cl.
CPC ........ *G06F 9/3863* (2013.01); *G06F 9/30101* (2013.01); *G06F 9/30116* (2013.01)

(58) Field of Classification Search
None
See application file for complete search history.

(56) References Cited

U.S. PATENT DOCUMENTS

| 6,941,489 | B2 * | 9/2005 | DeLano | G06F 11/1405 |
| | | | | 714/10 |
| 8,028,152 | B2 | 9/2011 | Glew | |
| 8,266,412 | B2 | 9/2012 | Glew | |
| 8,296,550 | B2 | 10/2012 | Glew | |
| 10,007,521 | B1 * | 6/2018 | Tam | G06F 9/384 |
| 2009/0055631 | A1 | 2/2009 | Burky et al. | |
| 2017/0109166 | A1 * | 4/2017 | Eisen | G06F 9/3891 |

OTHER PUBLICATIONS

Rudd, K.W., Efficient Exception Handling Techniques for High-Performance Processor Architectures, Aug. 1997.
Disclosed Anonymously, Fast Distributed History Buffer Restore of Partially Written Data to a GPR in a Multislice Microprocessor, Jun. 26, 2017.
Disclosed Anonymously, Method and System for a Simplified Restore of a Mapper State after a Flush Operation, Aug. 11, 2010.

* cited by examiner

*Primary Examiner* — John M Lindlof
(74) *Attorney, Agent, or Firm* — Scully, Scott, Murphy & Presser, P.C.

(57) ABSTRACT

A computer system, processor, and method for processing information is disclosed that includes partitioning a logical register in the processor into a plurality of ranges of logical register entries based upon the logical register entry, assigning at least one recovery port of a history buffer to each range of logical register entries, initiating a flush recovery process for the processor, and directing history buffer entries to the assigned recovery port based upon the logical register entry associated with the history buffer entry.

20 Claims, 8 Drawing Sheets

LOGICAL REGISTER RECOVERY WITHIN A PROCESSOR

BACKGROUND OF INVENTION

The present invention generally relates to information handling and data processing systems, processors, and more specifically to recovering and restoring logical registers after a flush operation.

Modern information and data handling systems and processors often execute instructions out of order to achieve greater processing efficiency. Processors, to handle executing out-of-order instructions, typically are "pipelined" and have multiple elements that operate in parallel to process multiple instructions in a single processing cycle. Pipelining involves processing instructions in stages, so that the pipelined stages may process a number of instructions concurrently. To improve throughput processors may include multiple pipelines or execution slices within each processor core. Multiple execution slices may be used as part of simultaneous multi-threading (SMT) within a processor core.

Typically a processor pipeline may refer to a set of data processing circuitry or hardware units connected in series within a processor. The processor pipeline usually includes a number of stages, and may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue (ISQ) typically is issued to an execution unit in an "execution" stage. The "execution" stage processes the operation as specified by the instruction. Executing an operation specified by an instruction typically includes accepting data, e.g., one or more operands, and producing one or more results. There are usually registers and queues associated with the execution units and/or the issue queue (ISQ) to hold data, information and/or instructions for the execution units.

Out of order processors execute instructions as soon as its operands are available (and valid), independent of the original instruction sequence. Consequently, as these processors execute out-of-order instructions, they generate numerous temporary register results. The temporary values are stored together with completed values in register files. The temporary values become complete or permanent values when the corresponding instructions are complete.

Executing instructions out-of-order creates additional complexity in handling and processing instructions. Depending upon how the instructions are handled in out-of-order processors, processor latency and inefficiency may result. In out-of-order processors, an instruction can change a register value before all of the prior instructions complete. If any of the prior instructions cause an exception or interruption, then all of the sequential instructions prior to the time of the exception, e.g., an interruptible instruction, will need to be flushed. As a result, the registers allocated to the instruction being flushed will also need to be flushed.

One of the complexities in handling and processing out-of-order instructions is restoring the processor state in the event of an interruptible instruction, e.g., a mispredicted branch instruction. In this regard, registers will need to be flushed and restored to the state they were in before the exception, e.g., interruptible instruction. Flushing and recovering the contents of the logical registers can introduce latency and delay to a processor.

SUMMARY

The summary of the disclosure is given to aid understanding of a computer system, computer architectural structure, processor, and method of restoring logical registers in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

Certain aspects of the present disclosure provide a method of processing data in a processor that includes partitioning a logical register in the processor into a plurality of ranges of logical register entries based upon the logical register entry; assigning at least one recovery port of a history buffer to each range of logical register entries; initiating a flush recovery process for the processor; and directing history buffer entries to the assigned recovery port based upon the logical register entry associated with the history buffer entry. In an embodiment, the method further includes recovering the history buffer entries to a mapper dedicated to one of the plurality of ranges of logical register entries, and in an aspect restoring the logical register entries, and/or releasing two history buffer entries per slice, per range to each mapper, per cycle. In an embodiment, the logical register entries assigned to a range are not contiguous logical register entries, and in an aspect, the logical register bit field is used to partition the logical register into the plurality of ranges.

In an embodiment, a computer system for processing information is disclosed, the computer system including at least one computer processor for processing instructions, the processor having one or more physical register files having entries to store data; one or more logical registers having a plurality of entries to store data; one or more logical registers mappers configured to map the entries in the one or logical registers to the entries in the one or more physical register files; and a history buffer having a plurality of recovery ports associated with the mapper, and a plurality of entries for storing information associated with a processor instruction evicted from the logical register. The processor in an embodiment is configured so that the logical register is partitioned into a plurality of ranges of logical register entries based upon the logical register entry and each recovery port in the history buffer is assigned one of the plurality of ranges of logical register entries. In an embodiment, each range of logical register entries is determined by the last two digits in the bit field identifying the logical register entry, and in an aspect, one mapper is associated with each range of logical register entries and at least one history buffer recovery port per slice is dedicated to each mapper, and/or each mapper includes a multiplexor for checking all the logical register entries within the range of the logical register entries assigned to that mapper.

In a further embodiment, a computer system for processing information is disclosed, the computer system including at least one computer processor for processing instructions, the processor having a physical register file that includes a plurality of entries to store data associated with the processor instructions; a logical register having a plurality of logical register entries, the logical register configured to have a plurality of ranges of logical register entries; one or more logical register mappers for the mapping the logical register entries to entries in the physical register file, the one or more logical register mappers having a plurality or restore ports with at least one mapper assigned to each range of logical register entries; and a history buffer associated with the logical register mapper and having a plurality of entries for storing information evicted by a younger processor instruction, the history buffer having a plurality of recovery ports. The processor in an embodiment is configured to assign each recovery port in the history buffer to one of the plurality of ranges of the logical register entries, and to assign each recovery port in the history buffer to at least one restore port in the logical register mapper.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of the information handling system, computer system, computer architectural structure, processor, history buffers, mappers, logical registers, and their method of operation will be better understood when read in conjunction with the figures provided. Embodiments are provided in the figures for the purpose of illustrating aspects, features and/or various embodiments of the computer system, computer architectural structure, processor, history buffers, e.g, Save & Restore Buffers (SRB), logical registers, mappers and their method of operation, but the claims should not be limited to the precise arrangement, structures, features, aspects, embodiments or devices shown, and the arrangements, structures, subassemblies, features, aspects, methods, processes, embodiments, and devices shown may be used singularly or in combination with other arrangements, structures, subassemblies, features, aspects, processes, methods, embodiments, and devices.

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, history buffers, e.g., SRBs, logical registers, mappers, and their method of operation, however, it will be understood by those skilled in the art that different and numerous embodiments of the computer system, computer architectural structure, processor, history buffer, logical registers, mappers and their method of operation may be practiced without those specific details, and the claims and invention should not be limited to the embodiments, subassemblies, features, processes, methods, aspects, features, or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of history buffers to restore the contents of logical registers. It may be noted that a numbered element is numbered according to the figure in which the element is introduced, and is typically referred to by that number in succeeding figures.

Figure 1:
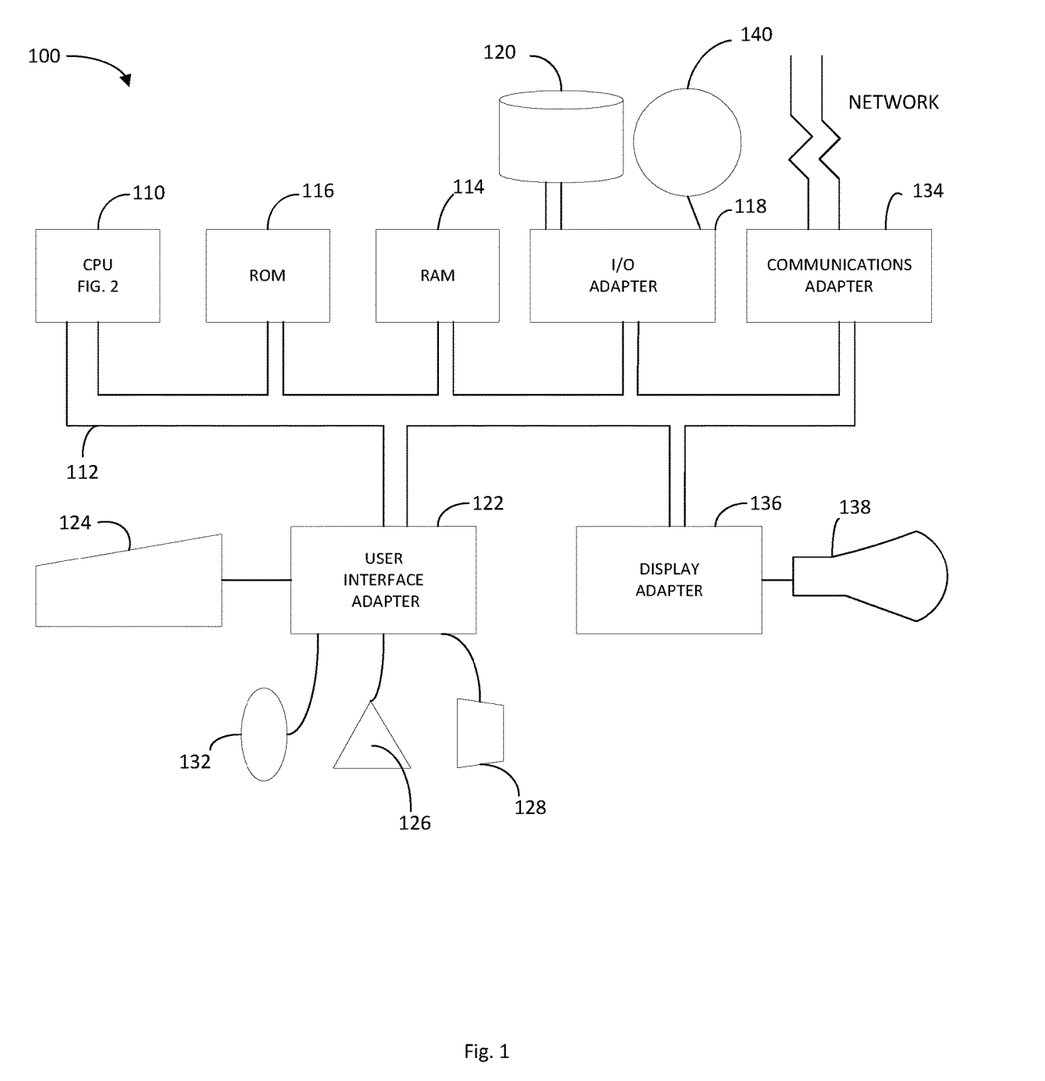
FIG. 1 illustrates an example of a data processing or information handling system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. Processor 110 may have a bus interface unit coupled to the bus 112 for controlling transfers of data and instructions between memory, such as random access memory 114, and caches, e.g. instruction cache (I-Cache) and data cache (D-Cache). Data cache and instruction cache may each have various levels of cache, such as, for example, L1 cache, L2 cache, and/or L3 cache.

I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various logic units, functional units, registers, queues, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
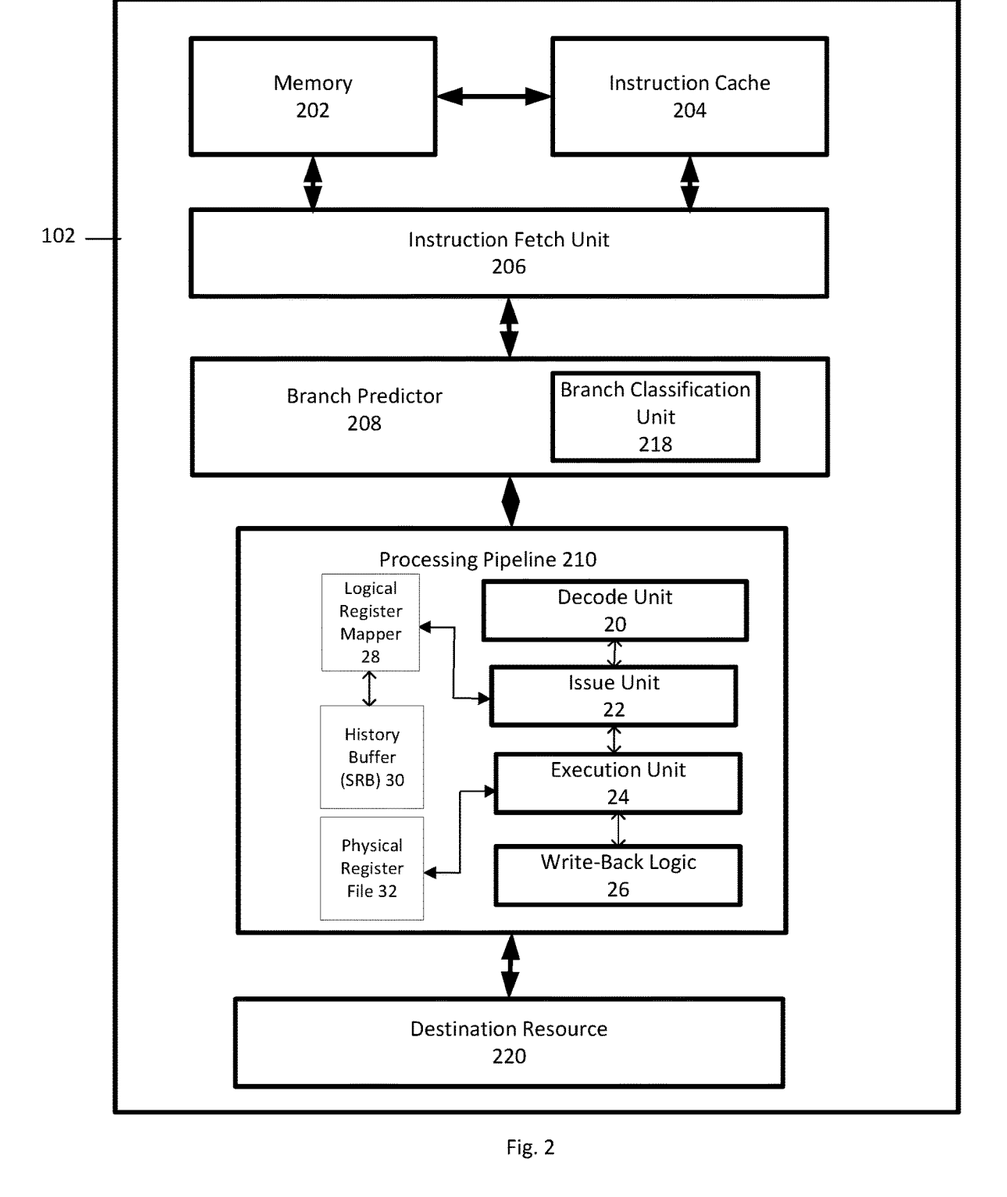
FIG. 2 illustrates a block diagram of a processor in which certain aspects of the present disclosure may be practiced.

FIG. 2 depicts a block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. A data cache (not depicted) may also be included in the processor 110.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units, vector scaler execution units, and/or other execution units. The logical register mapper 28 contains entries which provide a mapping between a logical register entry (LReg) and an entry in the physical register file 32. When an instruction wants to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architectured register states and backs up the logical register file data when a new instruction is dispatched. In this regard, the history buffer stores information from the logical register mapper 28 when a new instruction evicts data in case the new instruction is flushed and the old data needs to be recovered. The history (SRB) 30 buffer keeps the stored information until the new instruction completes. The history buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

In certain aspects, a CPU 110 may have multiple execution/processing slices with each slice having one or more of the units shown in FIG. 2. For example, each processing slice may have its own processing pipeline 210 with functional/execution units 24. A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. In an example, each processing slice may be an independent processor (e.g., processor 110) and may execute instructions independently of other processing slices in the multi-slice processor, so that multiple threads may be simultaneously executed by the multi-slice processor. Simultaneous processing in multiple slices may considerably increase processing speed of the multi-slice processor. In single-thread (ST) mode a single thread is processed, and in SMT mode, two threads (SMT2) or four threads (SMT4) are simultaneously processed.

Figure 3:
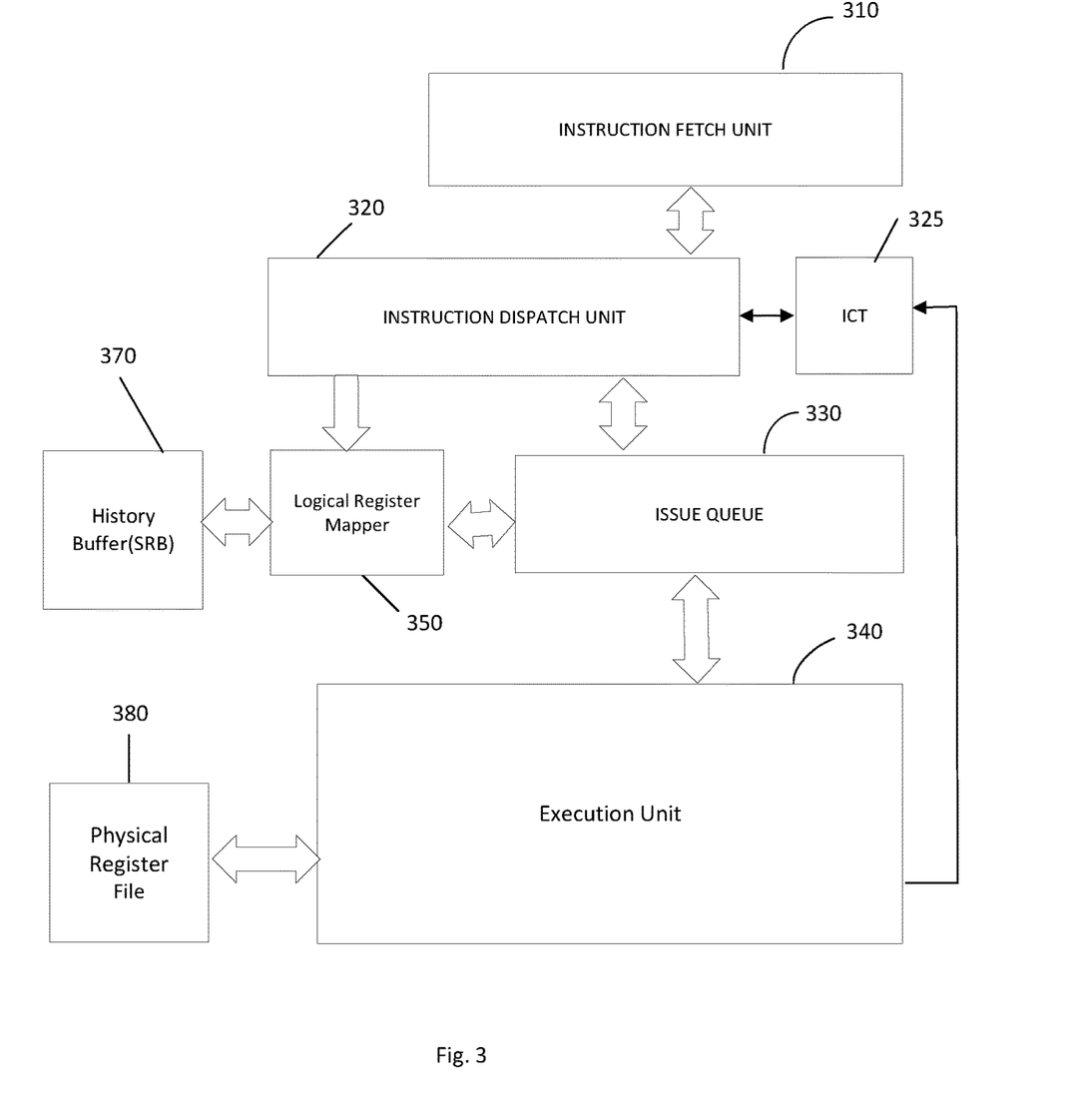
FIG. 3 illustrates a block diagram of a multi-slice processor in accordance with an aspect of the disclosure in which certain aspects of the present disclosure may be practiced.

FIG. 3 illustrates a block diagram of a portion of a processor 110. The pipeline 300 in the processor 110 in FIG. 3 includes Instruction Fetch Unit 310, Instruction Dispatch Unit 320, Issue Queue (ISQ) 330, Instruction Completion Table (ICT) 325, Execution Unit 340, Logical Register Mapper 350, history buffer (SRB) 370, and Physical Register File 380. The Execution Unit 340 may include one or more queues to hold instructions for execution by the Execution Unit 340.

The Instruction Fetch Unit 310 fetches instructions to be executed by the processor 110 or processor slice and sends them to the Instruction Dispatch Unit 320. The Instruction Dispatch Unit 320 dispatches instructions to the Issue Queue (ISQ) 330, typically in program order. The Issue Queue (ISQ) 330 will issue instructions to the Execution Unit 340. The ISQ 330 typically holds an instruction until data associated with the instruction has been retrieved and ready for use. A physical register file 380 may serve to store data to be used in an operation specified in an instruction dispatched to an execution unit 340, and the result of the operation performed by the Execution Units 340 may be written to the designated target register entry in the physical register file 380.

When data is not ready, e.g., not within the appropriate data cache or register, delay can result as the ISQ 330 will not issue the instruction to the Execution Unit 340. For at least this reason, the Issue Queue (ISQ) typically issues instructions to the Execution Units 340 out of order so instructions where the required data is available can be executed. Dispatch Unit 320 will stamp each instruction dispatched to the Issue Queue 330 with an identifier, e.g., identification tag (itag), to identify the instruction. The Dispatch Unit 320 may stamp instructions with other information and meta data. The instructions (itags) are allocated (assigned) and stamped in ascending program order on a per thread basis by the Dispatch Unit 320. Dispatch Unit 320 may also maintain a per thread instruction counter that increments for each instruction in a thread that is dispatched to the Issue Queue 330.

The Execution Unit 340 executes instructions out of order and when the Execution Unit 340 finishes an instruction, the Execution Unit 340 will send the finished instruction, e.g., itag, to the ICT 325. The ICT 325 contains a queue of the instructions dispatched by the Dispatch Unit 320 and tracks the progress of the instructions as they are processed. In an embodiment, the ICT 325 has a completion tail pointer that keeps track of the progress of executing instructions in the thread, e.g., points to the next to complete instruction. The instruction entry in the ICT will not identify the instruction as complete until all older instructions in the thread are completed.

There are circumstances when the instructions and corresponding entries in the logical register mapper 350 and the history buffer (save and restore buffer (SRB)) 370 in the pipeline will need to be flushed. For example, where an interruptible instruction, e.g., branch mispredict, occurs, the information in the logical registers will need to be flushed and restored. The processor may include a history buffer, e.g., Save & Restore Buffer (SRB) 370, to save a processor state before, for example, an interruptible instruction, so that if an interrupt occurs, control logic may recover the processor state to the interrupt point by restoring the content of registers, memory cache, and main memory.

In operation, when a new instruction with an instruction tag (itag) produces a value to be stored in a logical register "x" after it is executed, the prior value in logical register "x" is evicted from logical register "x", and the data and information associated with the instruction is stored in the history buffer (SRB) 370. That is, history buffer (SRB) 370 contains logical register entries the logical register mapper 350 evicted from the logical register mapper 350 by younger instructions. The information stored in the history buffer (SRB) 370 may include the itag of the instruction that evicted the logical register entry (i.e., the evictor itag) from the logical register. History buffer (SRB) 370, in an embodiment, stores itag, logical register entry number (the bit field that identifies the logical register entry (LReg)), and Register File tag (RFTag) information. The RFTag is a pointer that correlates an entry in a logical register to an entry in the Physical Register File 380. History buffer (SRB) 370 may store and track other information. Each slice of history buffer (SRB) 370 has an interface to the logical register mapper 350 to recover the itag, and register file tag (RFTag) (and other meta data) for each evicted logical register entry (LReg). The information is kept in the history buffer (SRB) 370 in a history buffer (SRB) entry until the new instruction (evictor instruction) is completed. At which point there is no reason to keep the old entry in the history buffer, e.g., SRB 370, and the entry is removed from the history buffer, as there is no flush recovery that could cause the history buffer (SRB) entry to be recovered.

Logical register mapper 350 contains meta data (e.g., itag, RFtag, etc.) which provides a mapping between logical register entries (e.g., GPR1) and entries in physical register file 360. The RFtag is the pointer that correlates a logical register entry to a physical register file entry. For example, when an instruction wants to read a logical register, e.g., GPR1, the logical register mapper 350 tells issue queue 330, which tells execution unit 340 where in the physical register file 380 it can find the data, e.g., physical register array entry.

Flush recovery to logical registers is performed through logical register mappers 350 typically by slice from history buffers, e.g., SRBs 370. Logical register entries are restored after a flush from the history buffer (SRB) 370 to the logical register mapper 350. The SRB 370 restores the register meta data, itag, and the RFtag pointers to the logical register mapper 350 so instructions know where to get the correct data. During a flush operation, history buffer (SRB) entries to be recovered are read from the history buffer (SRB) and written to the logical register mapper 350. The logical register mappers 350 are typically partitioned into groups to cover the various types of logical registers, e.g., general purpose registers (GPR), floating point registers (FPR), vector/scalar registers (VSR), etc. For example, the logical register mappers 350 could be partitioned into three (3) groups, each group covering one of a GPR, FPR/lower VSR, and upper VSR logical register. For a logical register having ninety-six (96) entries and partitioned into three groups, each group of the logical register could have thirty-two (32) entries. Other divisions and groups of the logical register are contemplated.

Typically during recovery, only one logical register entry per cycle is recovered from the history buffer (SRB) per slice. Each logical register entry (LReg) recovered from the history buffer (SRB) typically requires the mapper to look up which out of all of the logical register entries (LRegs) does the recovered logical register entry (LReg) belong to. This requires a fan-out to each logical register entry for each history buffer (SRB) recovery (read) port, and a multiplexor selecting from all the recovery ports of the logical register. In other words, typically one logical register entry per cycle would be restored from the history buffer (SRB) and sent to the logical register mapper, and the mapper would look up which out of all the logical register entries does the restored logical register supplied from the history buffer (SRB) entry match. In a logical register having, for example, ninety-six (96) logical register entries (LRegs), this configuration and technique would require a large fan-out; in the example, a fan-out of ninety-six (96) logical register entries (LRegs) for each history buffer (SRB) recovery port, and a multiplexor selecting from all the history buffer recovery ports. This large fan-out and a multiplexor selecting from all the recovery ports of the history buffer (SRB) consumes significant wire resources and requires a large multiplexor associated with, connected to, and/or in front of each logical resister entry in the mapper. Such a configuration and technique may not meet cycle time restraints.

Disclosed is a technique, method, system, and/or processor for restoring logical registers to the state they were in before the exception, e.g., interruptible instruction. This disclosure speeds up the recovery of logical registers compared to traditional designs by utilizing one or more disclosed techniques, methods, configurations, systems, architectures, logic programming, and embodiments to decrease latency and increase the efficiency of a processor. In an embodiment, the logical register mapper is partitioned into ranges of logical register entries. In an aspect, a dedicated recovery port in the history buffer (SRB) is assigned to each range or group of logical registers in order to reduce multiplexor and signal fan-out requirements, and decrease the amount of cycles, and hence time, required to restore and recover the contents of logical registers.

In an embodiment, each recovery port in the history buffer (SRB) is assigned a range of logical register entries (LRegs) in the logical register mapper to reduce the fan-out and multiplexor requirements to only a specific range of logical register entries (LRegs) and ports connected within that range. In an embodiment, "n" logical register entries (LRegs) can be recovered per slice, per cycle, by using "n" recovery ports in the history buffer (SRB) per slice. In an aspect, each recovery port in the history buffer (SRB) is assigned a range of logical register entries (LRegs) in the logical register mapper, and preferably a non-contiguous range where each range interleaves logical register entries (LRegs) in the logical register mapper. Multiple recovery ports from the history buffer (SRB) to the logical register mapper are provided in an embodiment to facilitate high recovery bandwidth. In one example, a logical register with 96 entries is partitioned into four ranges, namely Range A, Range B, Range C, and Range D, where each range has twenty-four (24) logical register entries (LRegs), and thus each history buffer (SRB) recovery port would fan out to each of the twenty-four (24) logical registers entries (LRegs). More or less groups or ranges with more or less entries per group or range are contemplated by the disclosure.

Figure 4:
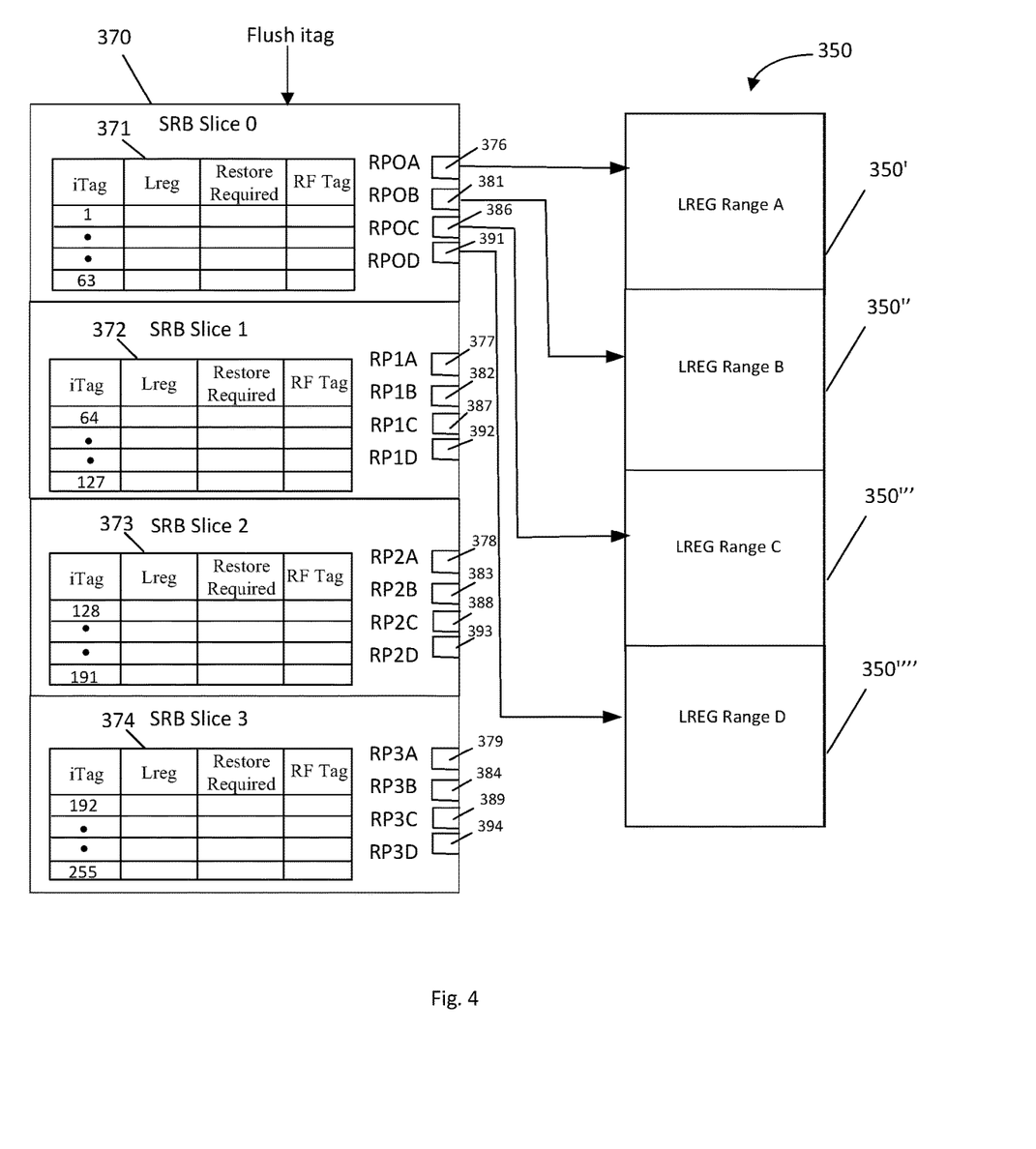
FIG. 4 illustrates a block diagram of a history buffer and logical register mapper.

FIG. 4 illustrates a block diagram of a history buffer, e.g., SRB 370, and associated logical register mappers 350 according to an example in which aspects of the present disclosure may be practiced. FIG. 4 will be used as an example to discuss features of the processor and the techniques and processes for recovering and/or restoring logical registers in a processor. SRB 370 in FIG. 4 has 256 entries across four slices where history buffer (SRB) entries 0:63 are in slice 0, history buffer (SRB) entries 64:127 are in slice 1, history buffer (SRB) entries 128:191 are in slice 2; and history buffer (SRB) entries 192:255 are in slice 3. Data is stored in history buffer (SRB) 370 when a new instruction is dispatched that evicts a logical register entry (LReg). Each entry in history buffer (SRB) 370 stores itag information, LReg data identifying the logical register entry, register file tag (RFTag) information, and a Restore Required bit as shown in FIG. 4, however, other metadata for each entry evicted from the logical register (and the logical register mapper) may also be stored. Each of slices 0:3 of history buffer (SRB) 370 is illustrated with the data for each entry of the history buffer shown graphically by boxes 371-374. Flush itag processing in the history buffer (SRB) sets the Restore-Required bit. Setting the Restore Required bit in an embodiment includes comparing the itag information saved in the history buffer (SRB) entries with a reference itag, e.g., the flush itag.

In an embodiment, there are multiple recovery ports from the history buffer (SRB) associated with, e.g., connected to, the logical register mappers. The history buffer (SRB) recovery ports are assigned to specific groups or ranges of the logical register entries. In an embodiment, the read/recovery ports of each slice of history buffer (SRB) 370 interface with logical register mapper 350 in order to restore and recover the contents of the logical register in the event of a flush recovery operation. FIG. 4 only shows the interconnections between slice 0 of history buffer (SRB) 370, specifically recovery read ports RPOA (376), RPOB (381), RPOC (386) and RPOD (391) of slice 0 of history buffer (SRB) 370, and the restore ports of and logical register mapper 350. In an example, each of the read ports of slices 0, 1, 2, and 3 of the history buffer (SRB) 370 are connected to respective logical register mapper groups or ranges. In FIG. 4, history buffer (SRB) recovery ports RPOA (376), RP1A (377), RP2A (378), and RP3A (379) are assigned to logical register range A; history buffer (SRB) recovery ports RPOB (381), RP1B (382), RP2B (383), and RP3B (384) are assigned to logical register range B; history buffer (SRB) recovery ports RPOC (386), RP1C (387), RP2C (388), and RP3C (389) are assigned to logical register range C; and history buffer (SRB) recovery ports RPOD (391), RP1D (392), RP2D (393), and RP3D (394) are assigned to logical register Range D. It is contemplated that history buffer (SRB) 370 may have more or less entries, more or less slices, and more or less read/recovery ports per slice.

The logical register is partitioned into several groups or ranges of entries, and each read or recovery port in SRB 370 is assigned a range of logical register entries, preferably by logical register mapper 350. History buffer (SRB) entries in an embodiment are recovered back to logical register mapper 350. In an aspect, each range or group of logical register entries are non-contiguous logical register entries (LRegs). Each range in an aspect interleaves logical register entries in the mapper 350. In an example, the logical register has ninety-six (96) entries (LRegs) divided into four ranges, LREG Range A, LREG Range B, LREG Range C, and LREG Range D, and each range or partition has twenty four (24) entries. A logical register with ninety-six (96) entries can have each logical register entry (LReg) identified by a seven bit field. This seven bit field identifying the logical register entry (LReg) can be saved in history buffer (SRB) 370 entries. The bit field identifying the logical register entry can be used to partition the logical register into groups, regions, or ranges, for example non-contiguous ranges. The digits, and in one example, the last two digits in the bit field identifying the logical register entry (LReg) can be used to partition and identify the region or range that the logical register entry belongs to. The last two bits in the bit field identifying the logical register entry (LReg), e.g., the seven bit field, may be used as illustrated in Table 1 to divide the logical register into ranges, groups, or regions, more particularly into four ranges.

TABLE 1

| Range | Bit Field |
| --- | --- |
| Range A | xxxxx00 |
| Range B | xxxxx01 |

TABLE 1-continued

| Range | Bit Field |
|---|---|
| Range C | xxxxx10 |
| Range D | xxxxx11 |

Accordingly, logical register entries (LRegs) 0, 4, 8, . . . , 88, 92 would be assigned Range A; logical register entries (LRegs) 1, 5, 9, . . . , 89, 93 would be assigned Range B; logical register entries (LRegs) 2, 6, 10, . . . , 90, 94 would be assigned Range C; and logical register entries (LRegs) 3, 7, 11, . . . , 91, 95 would be assigned Range D.

Figure 5:
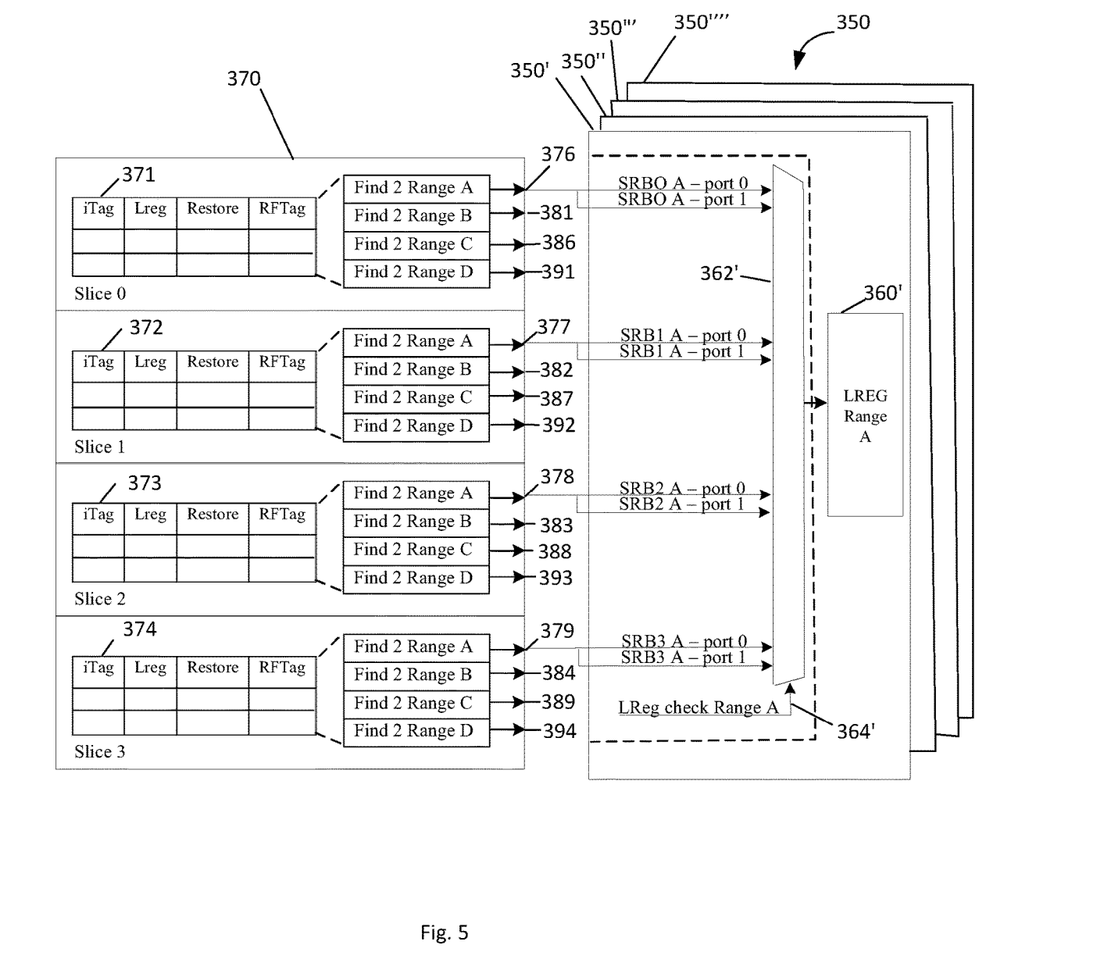
FIG. 5 illustrates a block diagram of a history buffer and mapper of a logical register partition.
Figure 6:
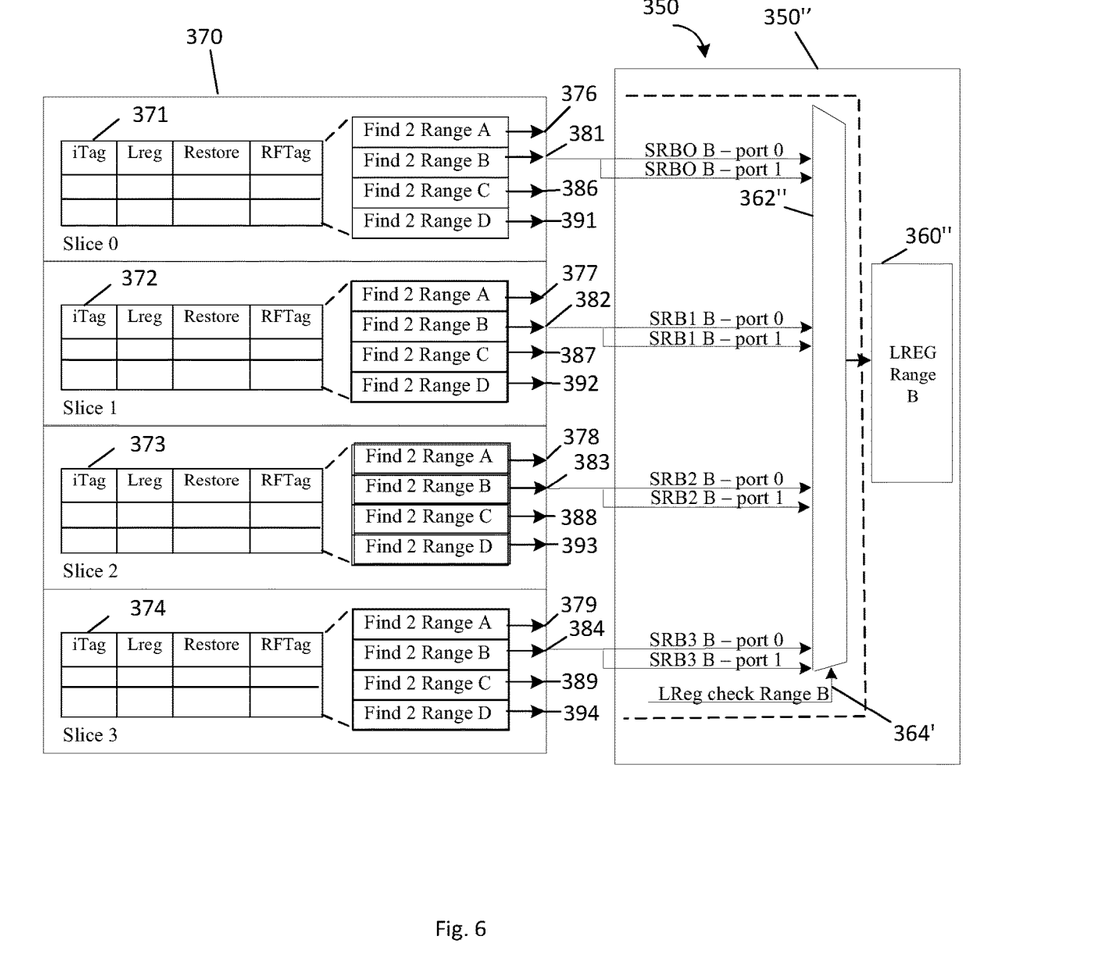
FIG. 6 illustrates a block diagram of a history buffer and a mapper for a different logical register partition.

FIGS. 5 and 6 show portions of the logical register mapper 350 and history buffer (SRB) 370. In FIGS. 5 and 6, each of the slices 0:3 of the history buffer (SRB) 370 has one or more dedicated recovery ports for each partition/range of logical registers, e.g., eight (8) history buffer recovery ports for each slice of the history buffer 370 in this example. Accordingly, as shown in FIGS. 5 and 6 there are two recovery ports 376 for Range A of slice 0 of history buffer (SRB) 370, two recovery ports 377 for Range A of slice 1 of history buffer (SRB) 370, two recovery ports 378 for Range A of slice 2 of history buffer (SRB) 370, and two recovery ports 379 for Range A of slice 3 of history buffer (SRB) 370. There are also two recovery ports 381 for Range B of slice 0 of history buffer (SRB) 370, two recovery ports 382 for Range B of slice 1 of history buffer (SRB) 370, two recovery ports 383 for Range B of slice 2 of history buffer (SRB) 370, and two recovery ports 384 for Range B of slice 3 of history buffer (SRB) 370 Similarly, there are two recovery ports 386, 387, 388 and 389 per slice for Range C of respective slices 0:3 of history buffer (SRB) 370, and two recovery ports 391, 392, 393 and 394 per slice for Range D of respective slices 0:3 of history buffer (SRB) 370.

FIG. 5 shows mapper interface A (350') where logical register Range A entries are recovered and restored, while FIG. 6 shows the mapper interface B (350") where logical register Range B entries are recovered and restored. Mapper interface C (350''') and mapper interface D (350'''') where logical register Range C and Range D entries are recovered and restored in an embodiment are configured the same as mapper interface A (350') and mapper interface B (350"). In FIGS. 5 and 6, each of slices 0:3 of history buffer (SRB) 370 is illustrated with the data for each entry of the history buffer (SRB) 370 shown graphically by boxes 371-374. In the embodiment of FIGS. 5 and 6, the logical register has been divided into four regions, portions, or ranges—LReg Range A (360'), LReg Range B (360"), LReg Range C (360'''), and LReg Range D (360''''). Each recovery port of history buffer (SRB 370) connects to a write (restore) port of logical register mapper 350. Accordingly, FIG. 5 shows eight (8) write ports for Range A LReg entries 360' of logical register mapper 350', while FIG. 6 shows eight (8) write ports for Range B LReg entries 360" of logical register mapper 350". Not shown in the figures are the eight (8) write ports for Range C LReg entries 360''' and the eight (8) write ports for Range D LReg entries 360'''' in the logical register mapper 350. As shown in FIGS. 5 and 6, each of the eight (8) write ports for each of the ranges (regions) (LReg Range A, LReg Range B, LReg Range C, and LReg Range D) of the logical register mapper 350 is fed into a multiplexor. In the example of FIGS. 5 and 6, the eight (8) write ports for each range of logical registers is fed to an 8:1 multiplexor. The output of each multiplexor fans out to the respective range, e.g., Range A, Range B, Range C or Range D, of logical register entries (LRegs) in the logical register. In the example of FIG. 5, the output of 8:1 multiplexor 362', is fanned out to check against the twenty-four (24) entries in Range A (360') of the logical register, and the output of the multiplexor 362" in FIG. 6 is fanned-out and checked against the twenty-four (24) logical register entries (LRegs) in Range B (360") of the logical register. While not shown, the output from the respective multiplexors that received the data from the write ports for Ranges C and D would be fanned out and checked against the respective Logical Register entries (LRegs) for Ranges C and D (360''' and 360''''). This configuration reduces the fan-out and multiplexor requirements to only the specific range of LReg entries and ports connected to that range, group, or region of the logical register.

During a recovery operation, Flush itag processing in the history buffer (SRB) 370 sets the Restore Required bit to identify the history buffer (SRB) entries that need to be restored in the logical register. History buffer (SRB) entries where the Restore Required bit is set are recovered back to the mappers 350. As shown in FIGS. 5 and 6, during a recovery operation, each slice of the history buffer (SRB) 370 drives, per cycle, two (2) entries for each range of logical registers entries (LRegs) to the history buffer (SRB) recovery ports. That is, the two (2) history buffer (SRB) recovery ports for Range A of slice 0, the two (2) history buffer (SRB) recovery ports for Range A of slice 1, the two (2) history buffer (SRB) recovery ports for Range A of slice 2, and the two (2) history buffer (SRB) recovery ports for Range A of slice 3 each provide, e.g., finds, two (2) logical register entries (Lregs) to be restored for each cycle. In an embodiment, two (2) Range A LReg entries in each slice 0:3 of the history buffer (SRB) 370 where the Restore Required bit is activated are found (e.g. read), and in an aspect the first entry and last entry in LReg Range A that are to be restored in each slice are found, and driven to recovery ports 376, 377, 378, and 379. In FIG. 6, two (2) Range B LReg entries in each slice 0:3 of the history buffer (SRB) 370 where the Restore Required bit is set (activated) are found, and in an aspect, the first and last entry in LReg Range B that are to be restored in each slice are found (e.g. read), and driven to recovery ports 381, 382, 383 and 384. Similarly, eight (8) Range C LReg entries (two from each slice 0:3) and eight (8) Range D Lreg entries (two from each slice 0:3) are found and driven to respective buffer (SRB) recovery ports 386-389 and recovery ports 391-394. Utilizing multiple recovery ports and multiple recovery ports per slice, from the history buffer (SRB) to the logical register mapper provides high recovery bandwidth for the processor. Utilizing two recovery ports per slice in the history buffer for each range of logical register entries (LRegs) provides high recovery bandwidth for the processor.

This process of finding the first and last entry in each slice of the history buffer (SRB) 370 to be restored would continue until all the entries to be restored in the logical register have been found and driven to its respective assigned (e.g., dedicated) recovery port in the history buffer. In an embodiment, the logical register mapper 350 has two (2) write (restore) ports for each range (region) of each slice of the history buffer (SRB) 370. Accordingly, as shown in FIG. 5, for each slice of history buffer (SRB) 370, port 0 of logical register mapper 350 receives the first entry of the LReg Range of entries to be restored (restored LReg) from history buffer (SRB) 370 and port 1 of logical register mapper 350 receives the last entry of the LReg Range of entries to be restored (restored LReg) from history buffer (SRB) 370. For example, for each slice 0:3, port 0, Range A (SRBx A-port 0) receives the first Range A LReg entry (restored LReg) from the history buffer (SRB), and port 1, Range A (SRBx A-port 1) receives the last entry Range A LReg to be restored (restored LReg) from the history buffer (SRB). Similarly, in FIG. 6, for each slice 0:3, port 0, Range B (SRBx B-port 0) receives the first Range B LReg entry to be restored (restored LReg) from the history buffer (SRB) 370, and port 1, Range B (SRBX B-port 1) receives the last Range B LReg entry to be restored (restored LReg) from the history buffer (SRB) 370.

Select line 364' into multiplexor 362' determines the output of the multiplexor and the desired logical register that is to be restored. In FIG. 5, the select line input 364' (Lreg check Range A) is limited to Range A of logical register entries, which in the example of FIG. 5 is the seven bit field for logical register entries (LRegs) 0, 4, 8 . . . , 88, or 92, and in FIG. 6, the select line input 364" (LReg check Range B) into multiplexor 362" is limited to Range B of logical registers, which in the example of FIG. 6 is the seven bit field corresponding to logical register entries (LRegs) 1, 5, 9, . . . 89 or 93. Thus, in the example of FIGS. 5 and 6, the output of the multiplexor for each range of logical registers, e.g., output at multiplexers 362', 362", 362'" (for Range C not shown), and 362"" (for Range D not shown), is checked against only a portion or range of the logical register entries, e.g., twenty-four (24) logical register entries (LRegs), and specifically the range of the logical register entries (LRegs) assigned to the respective dedicated recovery ports of the history buffer (SRB) 370 and respective restore ports of the mapper 350.

Figure 7:
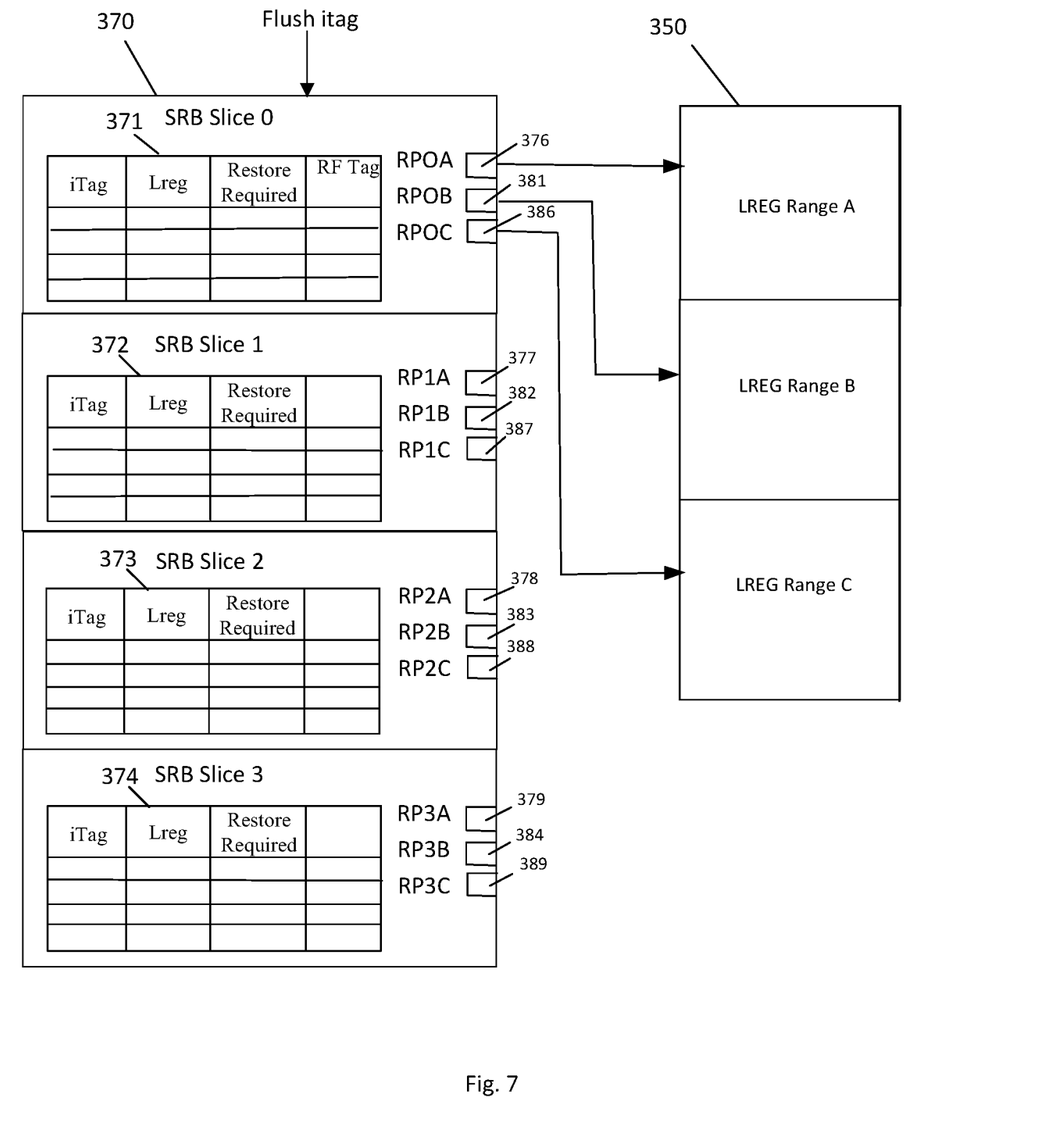
FIG. 7 illustrates a block diagram of another embodiment of a history buffer and a logical register.

FIG. 7 illustrates a block diagram of a history buffer (SRB) and logical register mapper according to an example in which aspects of the disclosure may be practiced. History buffer (SRB) 370 has 256 entries across four slices where history buffer (SRB) entries 0:63 are in slice 0; history buffer (SRB) entries 64:127 are in slice 1; history buffer (SRB) entries 128:191 are in slice 2; and history buffer (SRB) entries 192:255 are in slice 3. There are multiple recovery ports from the history buffer (SRB) associated with, e.g., connected to, the logical register mappers 350. The history buffer (SRB) recovery ports are assigned to specific ranges or groups of the logical register. In FIG. 7, the logical register file is partitioned into three groups or ranges of logical register entries—LREG Range A, LREG Range B, and LREG Range C. These logical register ranges are agnostic to the register type, and may include different types of registers: general purpose registers, floating point registers, and vector registers. In a preferred embodiment, each range or group of logical register entries (LRegs) in LReg Range A, LReg Range B, and LReg Range C are non-contiguous. The bit field identifying the logical register entry (LReg) can be used to partition the logical register into ranges, groups, or regions of logical register entries (LRegs). The LReg bit field can be used to partition the logical register into Ranges (or groups) as shown in Table 2.

TABLE 2

| Range | Bit Field |
| --- | --- |
| Range A | xxxxx 00; xxx0011 and xx01011 |
| Range B | xxxxx 01; xxx1011 and xx11011 |
| Range C | xxxxx 10 and xxx1111 |

In the example of FIG. 7, the 96 entry logical register 350 has two ranges of 35 LReg entries, e.g., Range A and B, and one range of 26 LReg entries, e.g., Range C. In the embodiment of FIG. 7, with a partitioning of the logical registers according to the example of Table 2, Range A would include logical register entries (LRegs) 0, 3, 4, 8, 11, 12, 16, 19, 20, 24, 28, 32, 35, 36, 40, 43, 44, 48, 51, 52, 56, 60, 64, 67, 68, 72, 76, 80, 83, 84, 88, 92; Range B would include logical register entries (LRegs) 1, 5, 7, 9, 13, 17, 21, 23, 25, 27, 29, 33, 37, 39, 41, 45, 49, 53, 55, 57, 59, 61, 65, 69, 71, 73, 77, 81, 85, 87, 89, 91, 93; and Range C would include logical register entries (LRegs) 2, 6, 10, 14, 15, 18, 22, 26, 30, 31, 34, 38, 42, 46, 47, 50, 54, 58, 62, 63, 66, 70, 74, 78, 79, 82, 86, 90, 94, 95.

The history buffer (SRB) 370 in FIG. 7 has two (2) recovery ports per slice for each range of LReg entries corresponding to the three ranges (e.g., partitioned nature) of the logical register. The example of FIG. 7 would have an 8:1 multiplexor associated with each logical register mapper similar to the multiplexors 362', 362" shown in FIGS. 5 and 6. There would be three mappers in FIG. 7 for the three logical register Ranges, each mapping a range of logical registers, i.e., Range A, Range B, and Range C.

Figure 8:
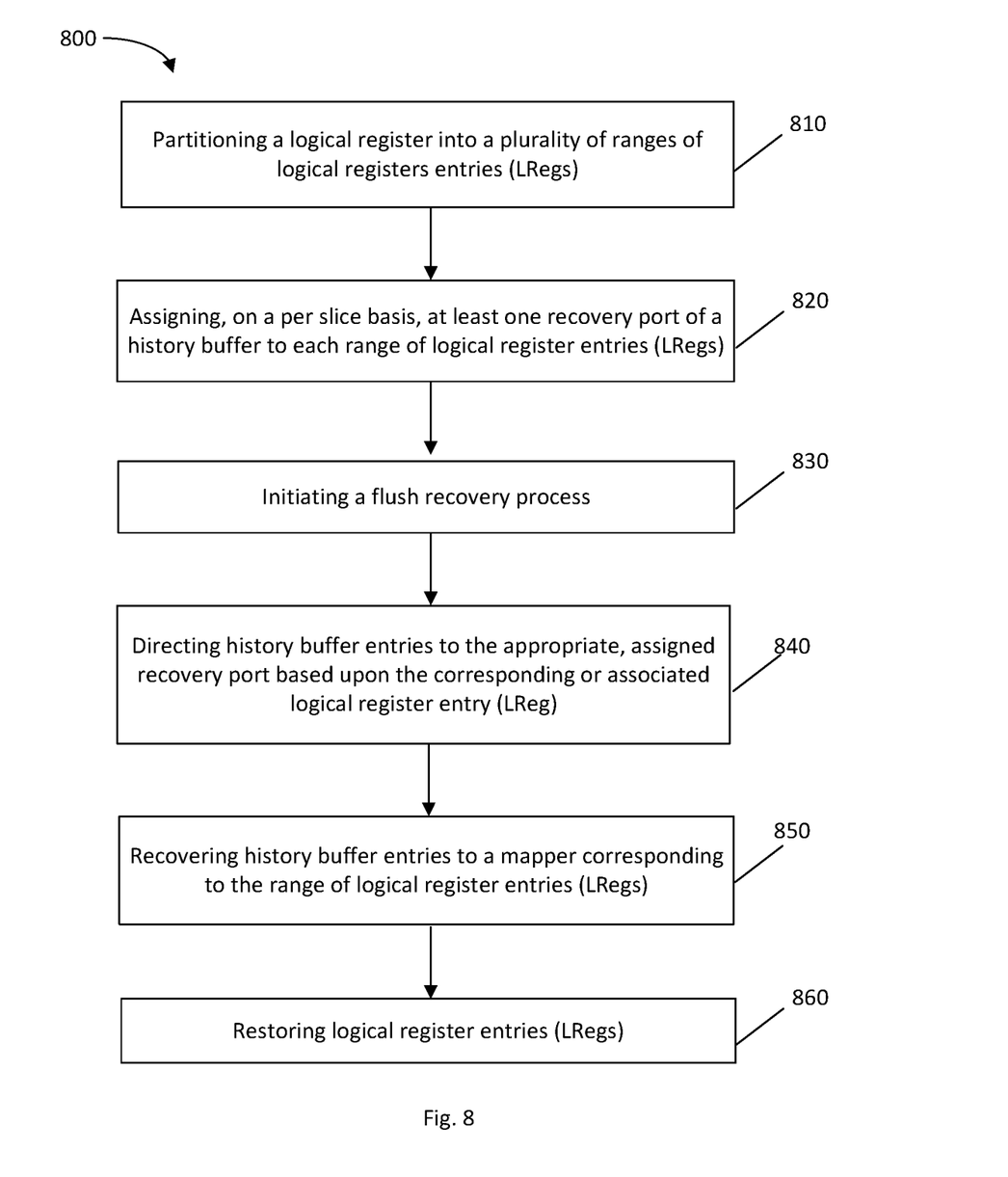
FIG. 8 illustrates a flow chart of a method of restoring a logical register.

FIG. 8 is an exemplary flowchart in accordance with one embodiment illustrating and describing a method of handling instructions in an information handling system, and more specifically a method of decreasing the time to recover logical registers after a flush operation, and/or decrease the time to perform a flush/recovery operation, in accordance with an embodiment of the present disclosure. While the method 800 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8, but the process may be integrated and/or one or more steps may be performed together, simultaneously, or the steps may be performed in the order disclosed or in an alternate order.

A method 800 of handling instructions in a processor is illustrated in FIG. 8, and more specifically a method of processing instructions in a processor to decrease latency of a processor, more specifically reduce the flush-recovery latency of a processor, including in an aspect decreasing the latency associated with processor recovery from a history buffer, e.g., a Save & Restore Buffer (SRB), and in another aspect of decreasing the latency associated with recovery of logical registers in a processor.

At 810 one or more logical registers are partitioned into a plurality of ranges or groups of logical register entries (LRegs). The range or group of logical register entities in an embodiment are preferably non-contiguous. In an aspect, the logical register is partitioned into ranges or groups using the bit field that is used to identify the entry in the logical register, e.g., the LReg bit field. In an embodiment, where the logical register has 96 entries, the bit field for the logical register may be seven bits, the last two bits of the bit field can be used to partition the logical register into ranges or groups, and the logical register in an aspect is partitioned into four ranges (Range A, Range B, Range C, and Range D).

In an embodiment, a history buffer, e.g., Save & Restore Buffer (SRB), may be used to restore the one or more logical registers. In this regard, information and data evicted from the one or more logical registers may be stored in the history buffer (SRB). For example, itag information, LReg information, RFTag, and other metadata may be stored in the history buffer (SRB). During a flush recovery process, information stored in the history buffer (SRB) may be processed in order to recover and restore one or more logical register entries (LRegs). For example, when there is an interrupt or exception, e.g., a mispredicted branch, the prior state of the logical registers that existed before the exception or interruptible instruction will need to be restored, which may require clearing (flushing) logical register entries or recovering (restoring) data back to the logical register.

The history buffer (SRB) is associated with, e.g., connected to, one or more logical register mappers and in an embodiment has one or more recovery (read) ports so that data and information stored in the history buffer (SRB) entries can be read and written to the logical register mappers. In an embodiment, at 820, at least one recovery (read) port of the history buffer is assigned, on a per slice basis, to each range of logical register entries (LRegs). Preferably, in an embodiment, at least two (2) recovery ports of the history buffer are assigned on a per slice basis to a logical register mapper where one mapper is assigned to each range of logical register entries (LRegs). In an aspect, the LReg bit field can be utilized to assign the recovery ports of the history buffer. In the example of FIGS. 4-6, the history buffer (SRB) recovery ports can be assigned to one of four ranges, e.g., Range A, Range B, Range C, and Range D. In another example, the history buffer (SRB) recovery ports can be assigned to one of three ranges, e.g., Range A, Range B, and Range C. The ranges, in an embodiment, contain non contiguous LReg entries.

At 830, a flush recovery process is initiated in a processor. The flush recovery process can initiate for a host of reasons beyond the scope of this disclosure, but as one example, the flush recovery process may initiate because a branch instruction is mispredicted and the processer pipeline needs to be flushed. In an embodiment, as part of the flush recovery process, a Restore Required bit may be set in the history buffer (SRB) for the appropriate history buffer (SRB) entries. In this regard, and according to an embodiment, the history buffer may receive a reference itag, e.g., a flush itag, and comparison may be made against the reference or flush itag to set the Restore Required bit.

In an embodiment, at 840, history buffer entries are directed, e.g., driven, to the history buffer recovery ports. In a preferred embodiment, the history buffer entries are directed to a specific appropriate recover port based upon the range of logical register entries to which the history buffer is associated with and/or assigned to. In this regard, the history buffer entry is associated with a certain logical register entry (LReg) and that logical register entry (LReg) is part of and/or associated with a particular range of logical register entries that have been assigned to a certain, preferably dedicated, recovery port. In an embodiment, history buffer entries are directed to certain recovery ports based upon the logical register entry to which the history buffer entry corresponds. In an embodiment, for each cycle, two history buffer entries are looked up per range of LReg entries, per slice. In an aspect, two (2) history buffer entries are directed to history buffer recovery ports per range of LReg entries, per slice.

In an embodiment, at 850, the history buffer entries are recovered, e.g., driven, to a mapper corresponding to the range of logical register entries. In an aspect, the history buffer entry corresponds to a range of the logical register entries (LRegs), and the history buffer entries are directed to a mapper based upon the partition or range of logical register entries. In an embodiment, the mapper has a write (restore) port for each history buffer recovery port. In an embodiment, per cycle, two (2) history buffer entries are driven per range of LRegs, per slice to two (2) mapper restore ports.

At 860, the logical register entries are restored. The process of restoring the logical register entries may include clearing data and/or information in the logical register entries and/or restoring data and/or information, e.g., writing data into the logical register entry. In an embodiment, the mapper includes a plurality of multiplexors to fan out and check the one or more history buffer entries written to the mapper to the range of logical register entries associated with, e.g., connected to, that recovery port. In an aspect, the mapper receives data from the history buffer (SRB) on mapper restore (write) ports and uses multiplexors to provide a path from the mapper restore port to the logical register entry. In an embodiment, where there is a match between the history buffer (SRB) entry recovered (driven) to the logical register and a logical register entry, the logical register entry may be disgarded, cleared, and/or restored with data recovered from the history buffer (SRB) entry. In an embodiment, the RFtag pointer in the logical register entry is updated.

While the illustrative embodiments described above are preferably implemented in hardware, such as in units and circuitry of a processor, various aspects of the illustrative embodiments may be implemented in software as well. For example, it will be understood that each block of the flowchart illustration in FIG. 8, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

In an embodiment, a computer system for processing information is disclosed where the computer system includes at least one computer processor for processing instructions, a logical register that includes entries to store data associated with the processor instructions, a history buffer having a plurality of entries for storing information evicted by a younger processor instruction, the history buffer having a plurality of recovery ports associated with the logical register, and one or more computer readable non-transitory storage media. The computer system in an aspect includes programming instructions stored on the one or more computer readable non-transitory storage media for execution by the at least one processor, the programming instructions comprising (a) programming instructions for partitioning the logical register into a plurality of ranges of logical register entries, (b) programming instructions for assigning, preferably on a per slice basis, at least one recovery port of the history buffer, preferably at least two (2) recovery ports, to each range of logical register entries, and (c) programming instructions for directing history buffer entries to the assigned recovery port based upon the logical register entry associated with the history buffer entry. In an embodiment, the processor further includes programming instructions for recovering history buffer entries to a mapper dedicated to the range of logical register entries to which the history buffer entry is associated and/or assigned. The processor in an aspect further includes programming instructions to restore the logical register entries. In an embodiment, the processor is configured to assign each recovery port in the history buffer to a dedicated mapper such that one recovery port per execution slice is assigned to one range of the logical register entries.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems that perform the specified functions or steps, or by combinations of special purpose hardware and computer instructions.

The programs described herein are identified based upon the application for which they are implemented in a specific embodiment of the invention. However, it should be appreciated that any particular nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, circuitry, chip, code, or portions thereof, which comprises one or more circuits, and/or executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of processing data in a processor, comprising:
partitioning a logical register in the processor into a plurality of ranges of logical register entries, each range of logical register entries comprising a plurality of logical register entries;
assigning one or more dedicated recovery ports of a history buffer to each range of logical register entries, wherein each range of logical register entries is assigned a different one or more dedicated recovery ports of the history buffer;
initiating a flush recovery process for the processor; and
directing one or more history buffer entries to the assigned one or more dedicated recovery ports based upon the logical register entry associated with a history buffer entry.

2. The method according to claim 1, wherein the logical register entries assigned to a range are not contiguous logical register entries.

3. The method according to claim 1, further comprising recovering the history buffer entries to a mapper dedicated to one of the plurality of ranges of logical register entries.

4. The method according to claim 3, further comprising restoring the logical register entries.

5. The method according to claim 1, wherein the processor has one or more slices, one or more logical register mappers, and processes data in one or more cycles, the method further comprising releasing two history buffer entries per slice, per range to each logical register mapper, per cycle.

6. The method according to claim 1, further comprising using a logical register bit field to partition the logical register into the plurality of ranges.

7. The method according to claim 1, wherein the processor has one or more slices and processes data in one or more cycles, the method further comprising recovering a plurality of logical register entries, per slice, per cycle to the logical register, wherein the plurality of recovered logical register entries is a function of the number of ranges of logical register entries.

8. The method according to claim 1, further comprising releasing the history buffer entries to a mapper and checking the logical register entries against the logical entries in one of the plurality of ranges of logical register entries.

9. The method according to claim 8, wherein a multiplexor is used to check the released history buffer entries to the logical register entries in only one of the plurality of ranges of logical register entries.

10. The method according to claim 1, wherein the processor comprises one or more slices, the history buffer has four recovery ports per slice and the logical register is partitioned into four ranges.

11. A computer system for processing information, the computer system comprising:
at least one computer processor for processing instructions, the processor comprising:
one or more physical register files having a plurality of entries to store data;
one or more logical registers having a plurality of entries to store data;
one or more logical registers mappers configured to map the entries in the one or logical registers to the entries in the one or more physical register files; and a history buffer having a plurality of recovery ports associated with the mapper, and a plurality of entries for storing information associated with a processor instruction evicted from the logical register,
wherein,
the logical register is partitioned into a plurality of ranges of logical register entries;
each recovery port in the history buffer is assigned and dedicated to one of the plurality of ranges of logical register entries, such that each range of logical register entries is assigned a different one or more dedicated recovery ports of the history buffer; and
history buffer entries, in response to a flush recovery process, are directed to the assigned, different one or more dedicated recovery ports of the history buffer based upon a logical register entry associated with the history buffer entry.

12. The computer system according to claim 11, wherein at least one range of logical register entries is a non-contiguous group of logical register entries.

13. The computer system according to claim 11, wherein each range of logical register entries is determined by a bit field identifying the logical register entry.

14. The computer system according to claim 13, wherein each range of logical register entries is determined by the last two digits in the bit field identifying the logical register entry.

15. The computer system according to claim 11, wherein the processor comprises one or more slices, the logical register is configured to have four ranges of logical register entries and the history buffer is configured to have a multiple of four recovery ports per slice.

16. The computer system according to claim 11, wherein the processor comprises one or more slices, one mapper is associated with each range of logical register entries and at least one history buffer recovery port per slice is dedicated to each mapper.

17. The computer system according to claim 16, wherein each mapper includes a multiplexor for checking all the logical register entries within the range of the logical register entries assigned to that mapper.

18. The computer system according to claim 17, wherein each mapper includes an 8:1 multiplexor.

19. A computer system for processing information, the computer system comprising:
at least one computer processor for processing instructions, the processor comprising:
a physical register file that includes a plurality of entries to store data associated with the processor instructions;
a logical register having a plurality of logical register entries, the logical register configured to have a plurality of ranges of logical register entries;
one or more logical register mappers for the mapping the logical register entries to entries in the physical register file, the one or more logical register mappers having a plurality or restore ports with at least one mapper assigned to each range of logical register entries; and
a history buffer associated with the logical register mapper and having a plurality of entries for storing information evicted by a younger processor instruction, the history buffer having a plurality of recovery ports,
wherein the processor is configured to:
assign each recovery port in the history buffer to one of the plurality of ranges of the logical register entries such that each range of logical register entries is assigned a different one or more dedicated recovery ports in history buffer;
assign each recovery port in the history buffer to at least one restore port in the logical register mapper; and
direct one or more history buffer entries to the assigned one or more dedicated recovery ports based upon a logical entry associated with the history buffer entry.

20. The computer system of claim 19, wherein each range of logical entries is determined by a bit field identifying the logical register entry.

* * * * *